United States Patent [19]

Bryant et al.

[11] Patent Number: 5,614,981
[45] Date of Patent: Mar. 25, 1997

[54] CAMERA WITH MAGNETIC ORIENTATION SENSOR

[75] Inventors: Robert C. Bryant, Honeoye Falls; Michael J. O'Brien, Rochester, both of N.Y.

[73] Assignee: Eastman Kodak Company, Rochester, N.Y.

[21] Appl. No.: 560,852

[22] Filed: Nov. 20, 1995

[51] Int. Cl.$^6$ ............................ G03B 17/00; G03B 17/24
[52] U.S. Cl. ............................................. 396/50; 396/319
[58] Field of Search ............................ 354/289.12, 105, 354/106

[56] References Cited

U.S. PATENT DOCUMENTS 5,016,039  5/1991  Sosa et al. ........................... 354/430
5,262,867  11/1993  Kojima ................................... 358/209
5,373,858  12/1994  Rose et al. ............................ 128/782
5,481,322  1/1996  Wakabayashi ......................... 354/105

*Primary Examiner*—Safet Metjahic
*Assistant Examiner*—Eddie C. Lee
*Attorney, Agent, or Firm*—David A. Howley; Charles E. Snee, III

[57] ABSTRACT

A photographic camera is provided with an orientation detector including first and second elements that move relative to one another under the influence of gravity, and a signal device that responds to magnetic fields between the first and second elements to represent camera orientation. One of the elements is magnetized and the other is a Hall-effect sensor that responds to magnetic fields to produce an electrical output indicative of camera orientation. The signal device includes a recording mechanism responsive to the electrical signal for recording the camera orientation on the film.

7 Claims, 5 Drawing Sheets

CAMERA WITH MAGNETIC ORIENTATION SENSOR

CROSS REFERENCE TO RELATED APPLICATION

Reference is made to and priority claimed from U.S. Provisional application Ser. No. U.S. 60/001,136, filed Jul. 13, 1995, entitled CAMERA WITH MAGNETIC ORIENTATION SENSOR.

FIELD OF THE INVENTION

The invention relates to photography and to photographic cameras. More specifically, the invention relates to such cameras including an orientation indicating device for providing information used to rectify image orientation during processing and viewing.

BACKGROUND OF THE INVENTION

It is known to display or record the orientation of a camera during a photographic event. Ohmura et al. U.S. Pat. No. 4,183,645, for example, discloses a pendulous mass that carries a mechanical switching element. In the horizontal position of the camera, corresponding to a landscape print, the switching element closes electrical contacts that record information parallel to the longer print dimension. In the vertical position of the camera, corresponding to a portrait print, the switching element closes different electrical contacts that record the information parallel to the shorter print dimension. Information, such as the date of the photograph, is exposed on the film in a proper orientation for reading when the printed image is held upright.

In an alternative embodiment, Ohmura et al. disclose a rolling cylinder constrained to move in an arcuate path. When the camera is tilted to one side or the other, the cylinder moves under the influence of gravity, closing isolated electrical contacts with the same effects described above.

Another example is disclosed by Vaynshteyn in his U.S. Pat. No. 4,801,793. A pendulum includes a switching element that controls several light emitting devices (LEDs) positioned to expose the film. The switching element selectively energizes the light emitting devices, depending on the horizontal or vertical orientation of the camera. The LED exposures are then used by the photofinisher during the printing sequence.

Still another example is disclosed in Adair U.S. Pat. No. 3,675,549. Adair also uses a pendulum for detecting the orientation of a camera, but senses the pendulum position with illuminated apertures that are selectively obscured by the pendulum in accordance with the orientation of the camera.

Any of the above devices can be used to detect camera orientation, and some include recording the information on the film for use during photofinishing. It will become apparent from the following description, however, that prior art devices suffer from reduced reliability and operating life compared to the present invention. They include moving contacts that tend to be unreliable electrically or unduly add to the frictional resistance of the moving parts. The rolling and contacting parts tend to stick as they wear and accumulate foreign matter, substantially reducing accuracy. Light emitting elements and photo interpreters, on the other hand, have a limited life and may be dim or cause undue battery drain.

SUMMARY OF THE INVENTION

The present invention is directed to overcoming one or more of the problems set forth above. Briefly summarized, according to one aspect of the invention, a photographic camera is provided with an orientation detector including first and second elements that move relative to one another under the influence of gravity, and a signal device that responds to magnetic fields between the first and second elements to represent camera orientation.

According to more specific features, one of the elements is magnetized and the other is a Hall-effect sensor that responds to magnetic fields to produce an electrical output indicative of camera orientation. The signal device includes a recording mechanism responsive to the electrical signal for recording the camera orientation on the film. Still more specifically, the film includes a magnetic layer, the recording mechanism includes a magnetic head, and the orientation of the camera is recorded magnetically on the recording layer adjacent the corresponding image.

In a preferred embodiment of the invention, the magnetic element includes a permanent magnet sandwiched between first and second eccentric flux plates that focus the magnetic field between the plates. The flux plates are mounted for pendulous movement to a plurality of positions indicative of camera orientation. The fixed structure includes a plurality of Hall-effect transducers spaced to intercept the focused magnetic field in at least two of the respective positions.

According to another embodiment of the invention, the magnetic element is a pendulous mass suspended on a flexible member fixed at one end to the camera. According to this embodiment, the orientation indicating device has no sliding parts.

The invention provides a small, low cost and reliable device for detecting camera orientation and encoding the orientation on the film. No human or machine judgment is required, the results are independent of scene content, and energy requirements are low compared to photodetection devices.

These and other features and advantages of the invention will be more clearly understood and appreciated from a review of the following detailed description of the preferred and alternative embodiments, from the appended claims, and by reference to the accompanying drawings.

DETAILED DESCRIPTION OF THE INVENTION

Figure 1:
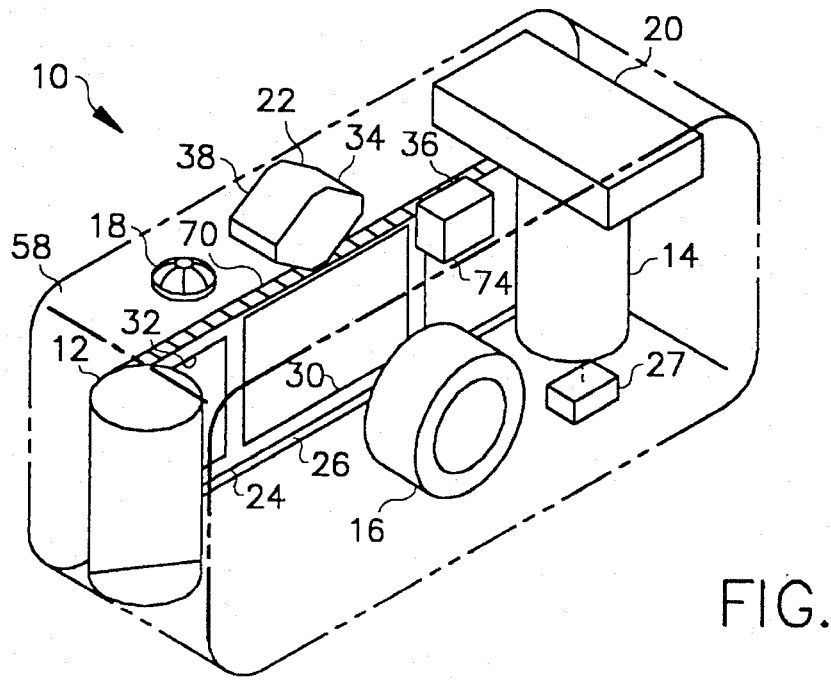
FIG. 1 is a perspective schematic view of a photographic camera including an orientation device in accordance with a preferred embodiment of the invention.

Referring now to the drawings, and beginning with FIGS. 1–4, a preferred embodiment of the invention is depicted in a photographic camera 10 including film supply and take-up chambers 12 and 14, optical system 16, exposure initiation member 18, viewfinder 20 and orientation indicating device 22.

Figure 5:
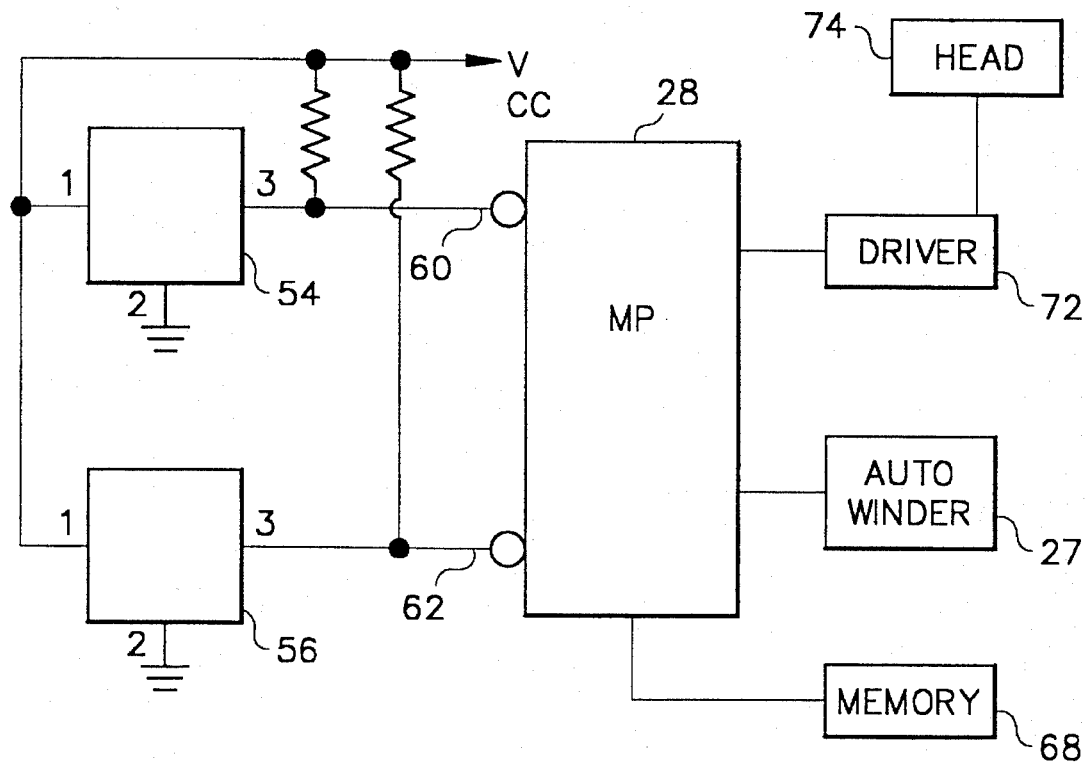
FIG. 5 is a schematic representation of a circuit used with the orientation device of the preferred embodiment.

Film 24 is loaded into supply chamber 12 and advanced sequentially across an exposure plane 26 to the take-up chamber 14. In this preferred embodiment, film advance is controlled by an auto-winder and metering device 27 that operates automatically at the end of each exposure sequence. The sequence is initiated by member 18 under the control of a microprocessor 28 (FIG. 5). The microprocessor 28 determines various exposure parameters, such as aperture size and shutter speed, operates the shutter to expose a film frame 30, and then advances the film to position the next successive frame 32 behind optical system 16. With the exception of the orientation indicating device 22, such camera features and components can be selected from well known commercially available alternatives.

Film 24 is similar a to commercially available format, often referred to as thirty five millimeter film, but preferably includes a transparent magnetic layer described more fully in numerous patents and other publications.

In accordance with the present invention, the camera 10 is provided with an orientation indicating device 22 that facilitates rectification of an exposed image during processing and viewing. Device 22 includes an orientation detector 34 that determines the orientation of the camera during an exposure and a signal device 36 (FIG. 5) that reads the orientation from detector 34 and records the orientation on the film adjacent the exposed frame.

Figure 2:
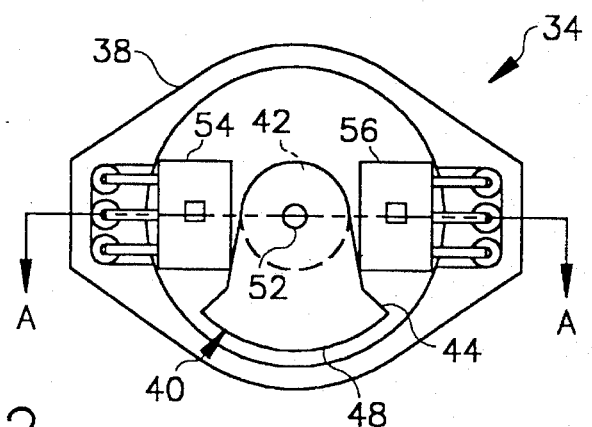
FIG. 2 is a plan view of the preferred orientation device included in the camera of FIG. 1.
Figure 3:
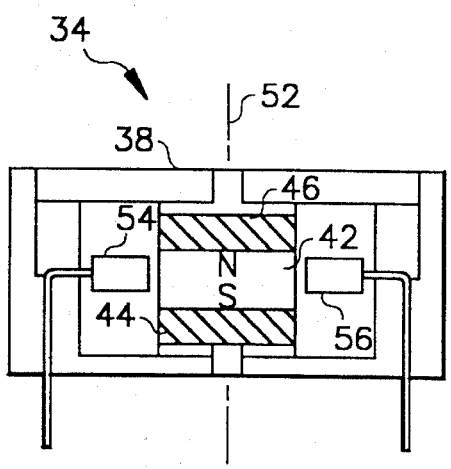
FIG. 3 is a is a cross-sectional view of the orientation device of FIG. 2 taken along section lines A—A in FIG. 2.
Figure 4:
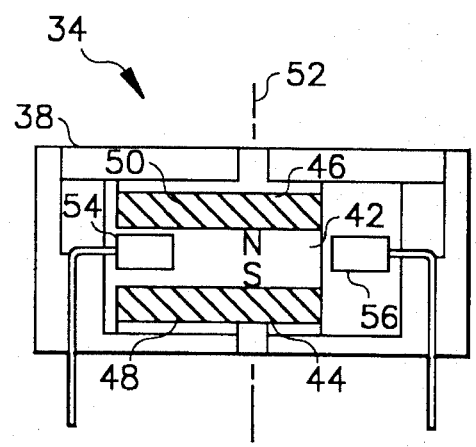
FIG. 4 is a cross-sectional view of the orientation device of FIG. 2 with a portion of the device rotated relative to the position depicted in FIG. 3.

The detector 34 is defined by a housing 38 that contains elements moveable relative to each other under the influence of gravity. In the preferred embodiment, one of the elements is a pendulous mass 40 including a permanent magnet 42 sandwiched between flux plates 44 and 46. The flux plates define an eccentric configuration, including bell shaped blades 48 and 50, that focus the field from magnet 42 between the eccentric portion of the blades. The magnet 42 and plates 44 and 46 are mounted for pivotal movement about an axis 52 so the eccentric portion of the plates, and the focused magnetic field, will move in an arc to a plurality of positions depending on and representing the orientation of the camera. In FIGS. 2 and 3, the detector is depicted in a horizontal position, corresponding to the horizontal position of the camera in FIG. 1. Blades 48 and 50 pivot freely about axis 52, and are pulled by gravity to the vertical position depicted in FIG. 2, with the magnetic field concentrated between the blades 48 and 50 below the pivotal axis 52. In FIG. 4 the camera has been rotated ninety degrees counter clockwise, so the blades 48 and 50 rotate in an arc to the leftward extending positions indicated in FIG. 4. If the camera were rotated a similar amount in a clockwise direction, the blades 48 and 50 would rotate to the right, one hundred and eighty degrees from the position depicted in FIG. 4.

The other element in the preferred embodiment comprises two stationary Hall-effect transducers 54 and 56 spaced in diametrically opposed positions on opposite sides of pivot axis 52. The term stationary is used in this context, and in the claims, to mean stationary relative to the housing 58 of camera 10. Transducers 54 and 56 are also positioned to intercept the focused magnetic field between blades 48 and 50, with the blades straddling the transducer, when the blades pivot in the counter clockwise and clockwise directions, respectively. Thus, the pivoting magnet and blades are a pendulous mass that detect the orientation of the camera while the Hall-effect transducers are position detectors that use magnetic fields to determine the position of the mass. The Hall-effect transducers are also part of the signal device 36, producing a signal representing that position of the pendulous mass and the camera orientation.

Figure 6:
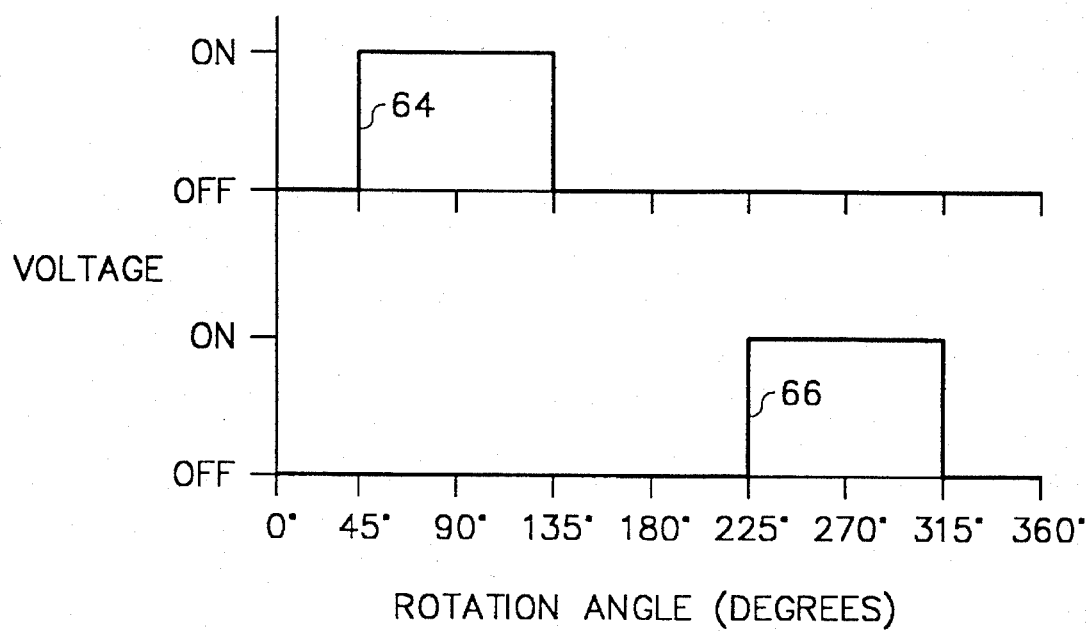
FIG. 6 is a graph depicting the electrical output of the circuit of FIG. 5.

The signal device is depicted most clearly in FIGS. 5 and 6 in combination with FIG. 1. The Hall-effect transducers are ultra sensitive Hall-effect switches such as the linear Hall-effect sensors sold by Allegro Micro Systems under the designation UGN3132LL. When subjected to a magnetic field, they produce a digital output in conductors 60 and 62 represented schematically in FIG. 6. Rotation of the camera in a counter clockwise direction, from approximately forty five to one hundred and thirty five degrees, turns on transducer 54, producing a voltage 64 in conductor 60. This is interpreted as a counter clockwise vertical camera orientation. Rotation of the camera in the other direction, or clockwise, is represented in FIG. 6 by the range of two hundred and twenty five to three hundred and fifteen degrees. This turns on transducer 56, producing the voltage 66 in conductor 62, and is interpreted as a clockwise vertical camera orientation. The absence of a voltage signal from either transducer 54 or 56 is interpreted as an upright horizontal camera orientation. Of course other magnetic transducers could be used in other positions to produce different signals.

When an exposure is initiated, and using frame 30 as an example, the microprocessor 28 reads and stores in appropriate memory 68 the presence or absence of voltage signals on lines 60 and 62. The microprocessor then records the stored information as a digital code along a strip 70 (FIG. 1) outside the exposure frames along one edge of the film. In the preferred embodiment, the recording is completed magnetically when the film is advanced between adjacent frames, such as 30 and 32. Microprocessor 28 controls the recording from memory through an appropriate driver 72 and magnetic head 74 positioned adjacent the film 24 at strip 70. During subsequent viewing and photofinishing operations, the magnetically recorded signal is decoded and used to rectify the exposed image in accordance with the camera orientation when the image was exposed.

A first alternative embodiment of the invention is depicted in FIGS. 7–10. Although similar to the preferred embodiment in many respects, this alternative embodiment suspends a permanent magnet 80 from one end of a flexible polymeric strap 82, and fixes the other end 84 of the strap to the housing 86, so there is no sliding movement between the strap and the housing. The Hall-effect devices 88 and 90 in this preferred embodiment are sold by Allegro Micro Systems under the designation UGN3501VA, and are type 3501 devices that produce an analogue output instead of the digital output of the preferred embodiment.

Figure 7:
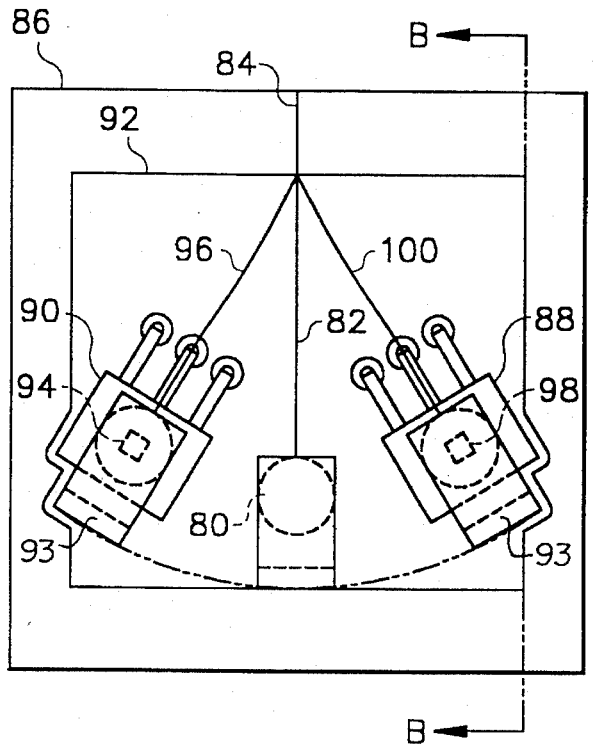
FIG. 7 is a is a plan view of a first orientation device according to an alternative embodiment of the invention.
Figure 8:
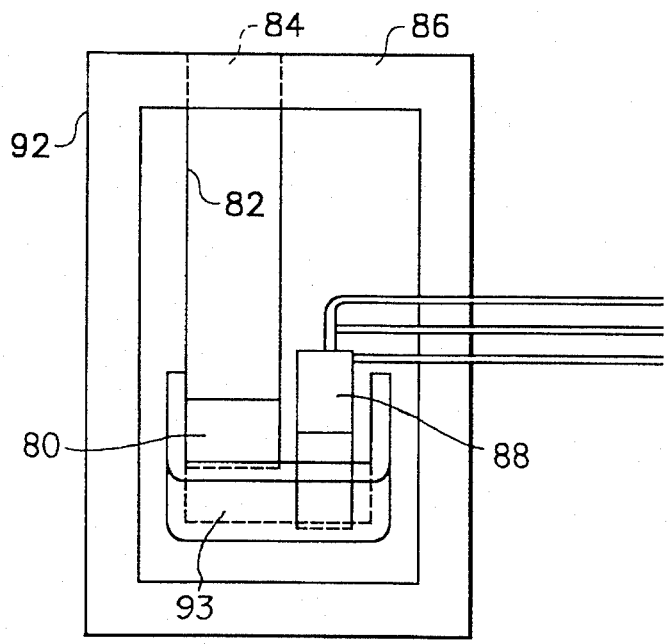
FIG. 8 is a cross-sectional view of the first alternative orientation device of FIG. 7.

Referring to FIGS. 7 and 8, the permanent magnet 80 is suspended on flexible strap 82 so the magnet will move as a pendulous mass under the influence of gravity. The strap is wide and stiff enough to constrain the pendulous movement to an arc in a predetermined plane within the supporting housing structure 92. As shown, a U-shaped metal clip 93 is attached to magnet 80, to provide a flux-path to focus the magnetic field on Hall-effect devices 88, 90. FIG. 7 depicts three positions of the pendulous mass. One, depicted at 80 and 82 represents the horizontal camera orientation. A second position, depicted at 94 and 96, represents one vertical camera orientation, and a third position, depicted at 98 and 100, represents the other vertical camera orientation. Hall-effect devices 88 and 90 are positioned in close proximity to the permanent magnet in its second and third positions, respectively.

Figure 9:
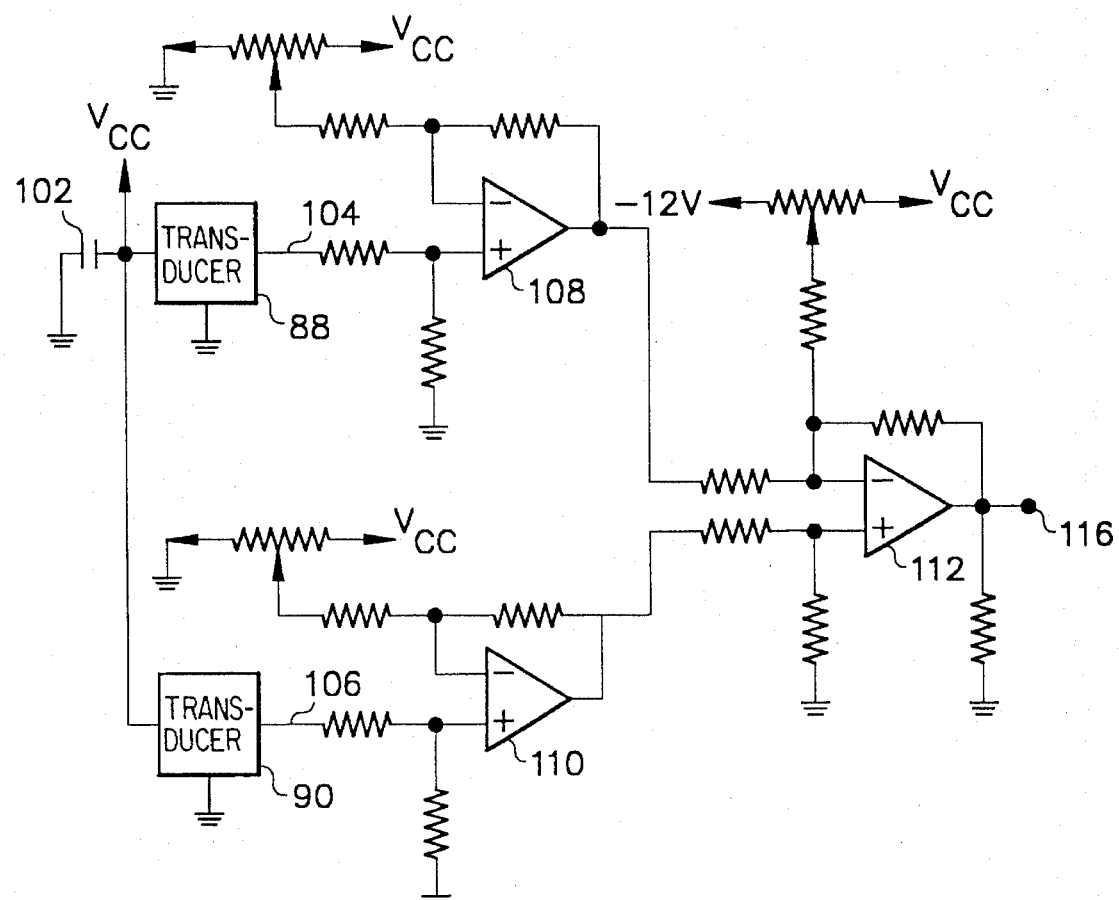
FIG. 9 is a schematic diagram of an alternative circuit for use with the alternative embodiment of FIGS. 7 & 8.
Figure 10:
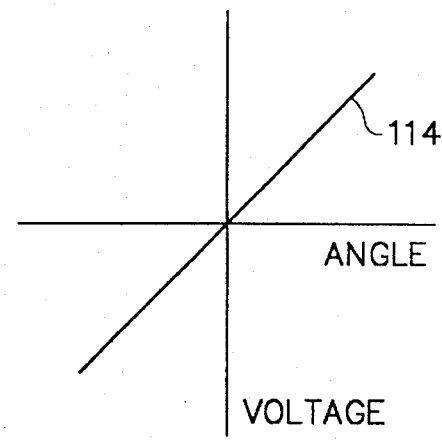
FIG. 10 is a graph representing the output of the circuit depicted in FIG. 9.

Referring to FIGS. 9 and 10, capacitor 102 is a filter for reducing noise in the circuits that supply current to Hall-effect devices 88 and 90. The Hall-effect devices respond to a magnetic field by producing an analog voltage in conductors 104 and 106 proportional to the intensity of the field at the devices. The respective outputs are amplified by linear amplifiers 108 and 110, and the difference between the amplified signals is amplified by a subtracting circuit including an operational amplifier 112. The signal 114 at the output 116 of the differential amplifier 112, represented in FIG. 10, is an analog voltage having an amplitude that varies with the orientation of the camera. As in the preferred embodiment, the output signal 114 is coded and recorded magnetically on the film.

Figure 12:
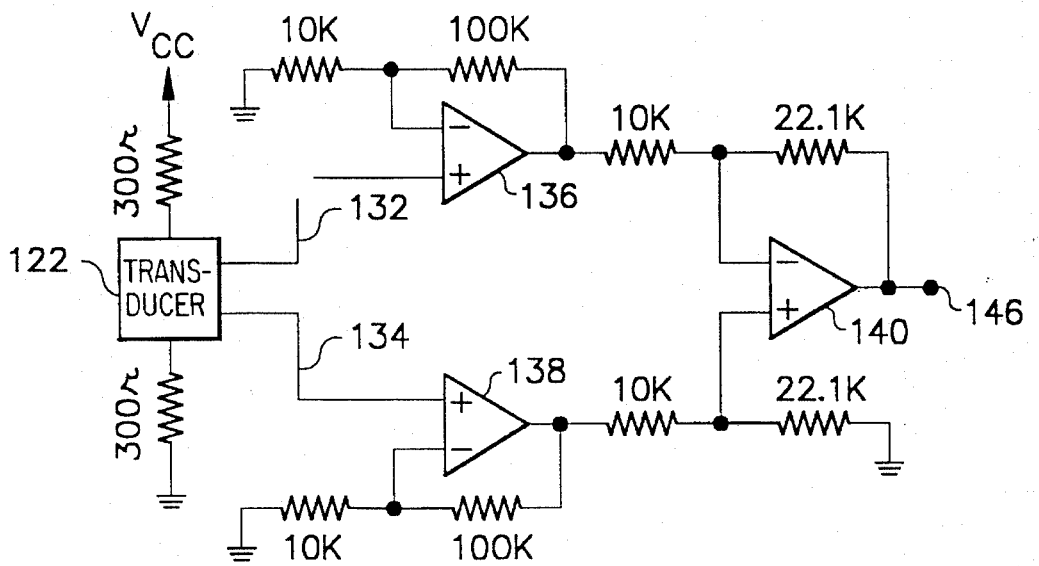
FIG. 12 is a schematic diagram of a second alternative circuit for use with the orientation device of FIG. 11.
Figure 11:
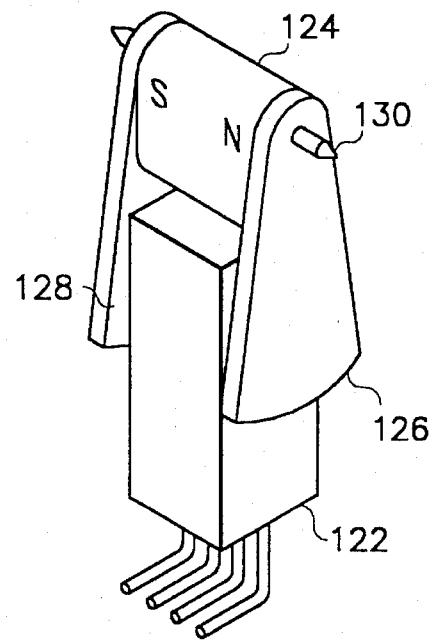
FIG. 11 is a schematic view of an orientation device according to a second alternative embodiment of the invention.
Figure 13:
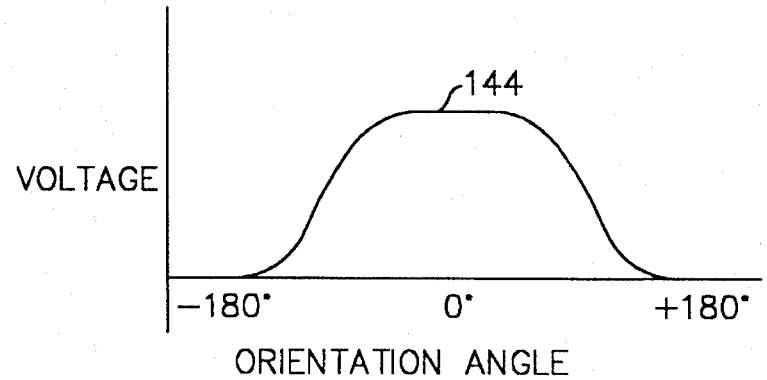
FIG. 13 is a graph representing the output of the second alternative embodiment of FIG. 10.

A second alternative embodiment of the invention is depicted in FIGS. 11-13. Again, the second alternative embodiment is similar to the preferred embodiment in many respects, but differs primarily in its use of a single Hall-effect device or cell 122. The pendulous mass is a permanent magnet 124, including flux concentrating plates 126 and 128, all mounted for pivotal movement on a pivot pin 130. The Hall-effect device is sold by Toshiba under the designation THS108A, and produces analog signals in output conductors 132 and 134 that are proportional the strength of the magnetic field intercepted by the device. The Hall-effect output is buffered by amplifiers 136 and 138 and the difference between the buffered signals is amplified at 140, producing an output signal 144 (FIG. 13) at contact 146 (FIG. 12).

FIG. 13 represents the output signal 144 for camera orientations ranging from minus one hundred and eighty degrees to plus one hundred and eighty degrees. The output signal is interpreted by the microprocessor of the preferred embodiment to determine corresponding camera orientations.

It should now be apparent that the preferred and alternative embodiments described above provide an improved orientation detector in a photographic camera having the noted features and advantages.

While the invention is described in connection with a preferred embodiment, other modifications and applications will occur to those skilled in the art. The claims should be interpreted to fairly cover all such modifications and applications within the true spirit and scope of the invention.

PARTS LIST

| Reference No. | Part |
| --- | --- |
| 10. | Photographic camera |
| 12. | Film supply chamber |
| 14. | Film take-up chamber |
| 16. | Optical system |
| 18. | Exposure initiation member |
| 20. | Viewfinder |
| 22. | Orientation indicating device |
| 24. | Film |
| 26. | Exposure plane |
| 27. | Autowinder |
| 28. | Microprocessor |
| 30. | Film frame |
| 32. | Film frame |
| 34. | Orientation detector |
| 36. | Signal device |
| 38. | Housing |
| 40. | Pendulous mass |
| 42. | Permanent magnet |
| 44. | Flux plate |
| 46. | Flux plate |
| 48. | Eccentric blade |
| 50. | Eccentric blade |
| 52. | Pivotal axis |
| 54. | Hall-effect transducer |
| 56. | Hall-effect transducer |
| 58. | Camera housing |
| 60. | Conductor |
| 62. | Conductor |
| 64. | Voltage |
| 66. | Voltage |
| 68. | Memory |
| 70. | Recording strip |
| 72. | Driver |
| 74. | Magnetic head |
| 80. | Permanent magnet |
| 82. | Polymeric strap |
| 84. | Strap end |
| 86. | Housing |
| 88. | Hall-effect transducer |
| 90. | Hall-effect transducer |
| 92. | Housing structure |
| 93. | U-shaped metal clip |
| 94. | Magnet in second position |
| 96. | Strap in second position |
| 98. | Magnet in third positoon |
| 100. | Strap in third position |
| 102. | Capacitor |
| 104. | Conductor |
| 106. | Conductor |
| 108. | Linear amplifier |
| 110. | Linear amplifier |
| 112. | Differential amplifier |
| 114. | Signal |
| 116. | Output contact |
| 122. | Hall-effect device |
| 124. | Magnet |
| 126. | Flux plate |
| 128. | Flux plate |
| 130. | Pivot pin |
| 132. | Output conductor |
| 134. | Output conductor |
| 136. | Buffering amplifier |
| 138. | Buffering amplifier |
| 130. | Differential amplifier |
| 134. | Output signal |
| 146. | Output contact |

We claim:

1. A photographic camera, comprising:

a housing;

a pendulous magnetic mass suspended in the housing for movement in response to changes of orientation of the camera;

first and second flux plates mounted for movement with the magnetic mass, the magnetic mass being positioned between the flux plates to enable the flux plates to focus a magnetic field between the flux plates; and at least one signaling device mounted in said housing to intercept the focused magnetic field between the flux plates and to produce a signal upon movement of the magnetic mass.

2. A camera according to claim 1, wherein the signaling device is a Hall-effect transducer which produces digital output signals.

3. A camera according to claim 1, wherein the camera is adapted to receive photographic film, further comprising a recording mechanism responsive to the signal for recording the orientation of the camera.

4. A camera according to claim 3, wherein the film includes a magnetic layer and the recording mechanism records magnetically onto the layer.

5. A camera according to claim 1, wherein the pendulous magnetic mass is suspended on a flexible member fixed at one end to the camera.

6. A camera according to claim 1, wherein the pendulous magnetic mass is rotatably supported by the camera.

7. A camera according to claim 1, wherein the signaling device comprises a pair of Hail-effect transducers spaced one from the other and the pendulous magnetic mass is suspended between the two transducers in a horizontal orientation of the camera.

* * * * *